United States Patent [19]

Pleickhardt et al.

[11] Patent Number: 4,518,293
[45] Date of Patent: May 21, 1985

[54] TUBE CONNECTOR

[75] Inventors: George C. Pleickhardt, Des Plaines; E. Grant Swick, Bartlett, both of Ill.

[73] Assignee: Illinois Tool Works Inc., Chicago, Ill.

[21] Appl. No.: 412,345

[22] Filed: Aug. 27, 1982

[51] Int. Cl.³ .................. F16B 37/02; F16B 37/04
[52] U.S. Cl. ........................... 411/107; 411/180; 411/182; 411/527; 16/42 T
[58] Field of Search .............. 411/103, 107, 108, 111, 411/112, 166, 176, 177, 180, 181, 182, 427, 521, 525, 526, 527, 528; 16/38, 39, 42 T; 403/405, 406

[56] References Cited

U.S. PATENT DOCUMENTS

| 654,956 | 7/1900 | Diss | 16/39 |
|---|---|---|---|
| 1,099,042 | 6/1914 | Heron et al. | 16/39 |
| 2,398,374 | 4/1946 | Hartman | 411/181 |
| 2,430,543 | 11/1947 | Tinnerman | 411/57 X |
| 2,435,079 | 1/1948 | Hotchkin | 411/427 X |
| 2,488,849 | 11/1949 | Churchill | 16/42 T |
| 2,637,462 | 5/1953 | Becker | 16/42 T |
| 2,654,620 | 10/1953 | Tinnerman | 411/176 X |
| 2,982,989 | 5/1961 | Heyer | 411/176 X |
| 3,000,047 | 9/1961 | Hill | 411/57 X |
| 3,017,658 | 1/1962 | McMeen et al. | 411/57 X |
| 3,251,619 | 5/1966 | Schlage | 411/103 X |
| 3,451,455 | 6/1969 | Parkin | 411/108 |

FOREIGN PATENT DOCUMENTS

| 1315137 | 12/1962 | France | 411/176 |
|---|---|---|---|
| 654901 | 7/1951 | United Kingdom | 411/177 |
| 1273560 | 5/1972 | United Kingdom | 411/177 |
| 2002083 | 2/1979 | United Kingdom | 411/112 |

Primary Examiner—Thomas J. Holko
Attorney, Agent, or Firm—J. P. O'Brien; T. W. Buckman

[57] ABSTRACT

A tube connector comprises an integral sheet metal stamping including a body and a plurality of legs. The body has a centrally disposed securing portion for receipt of a threaded fastener and is of a substantially dished shape presenting sharp peripheral edges for aggressively engaging the interior wall of a tube to resist retrograde movement of the connector axially of said tube. The legs extend generally axially from said body adjacent the periphery thereof and have sharp longitudinal edges for aggressively engaging the interior wall of a tube to resist rotating movement within said tube upon rotating association of a threaded fastener with the centrally disposed securing portion.

9 Claims, 6 Drawing Figures

TUBE CONNECTOR

BACKGROUND OF THE INVENTION

In many instances it is desired to fasten something to the end of a tube by means of a screw threaded fastener. This may be done to construct a frame, to secure the tube to mounting means such as to construct a towel bar, or for a multiplicity of other purposes.

OBJECTS AND SUMMARY OF THE PRESENT INVENTION

It is an object of the present invention to provide an improved sheet metal fastener for retention in the open end of a tube so that the fastener may be used to secure another member or article to the end of the tube.

It is a further object of the present invention to provide a fastener or tube connector as heretofore set forth which is simply pushed into the open end of a tube and which thereafter engages the inner walls of the tube so as to aggressively resist axial retraction from the tube and to resist rotation within the tube.

In achieving the foregoing and other objects and advantages a sheet metal fastener having a helical impression surrounding an aperture in the center thereof, a taped central aperture, or an axially extending threaded member are provided, having an outer periphery comprising an interrupted circle. The sheet metal member is formed in a dish-like configuration with the dished periphery of the member fitting tightly within a tube in which it is inserted, but due to its dished configuration allowing easy insertion and resisting axial withdrawal. The sheet metal fastener or member further is provided with axially directed legs having edges aggressively engaging the inner wall of the tube to resist rotation of the sheet metal member within the tube.

THE DRAWINGS

The invention will best be understood with reference to the following specification when taken in connection with the accompanying drawings, wherein.

DETAILED DESCRIPTION OF THE ILLUSTRATIVE EMBODIMENT

Referring now more specifically to the drawings wherein like parts are designated by the same numerals throughout the various figures.

Figure 1:
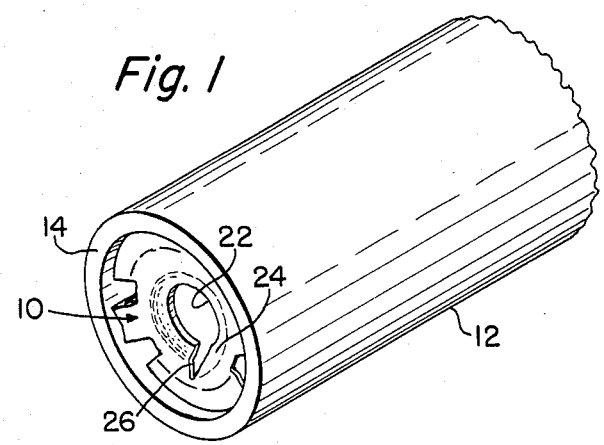
FIG. 1 is a perspective view showing one embodiment of the present invention as mounted within the end of a tube.
Figure 2:
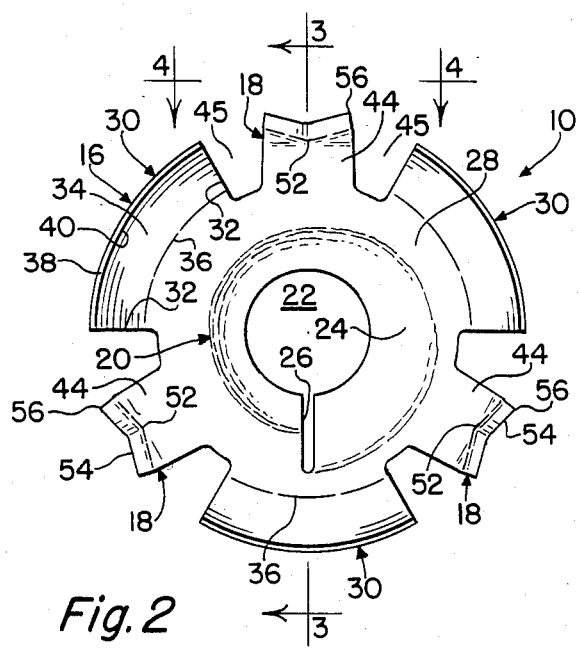
FIG. 2 is an end view of the sheet metal fastener or tube connector, as shown in FIG. 1, forming the subject matter of the present invention.
Figure 3:
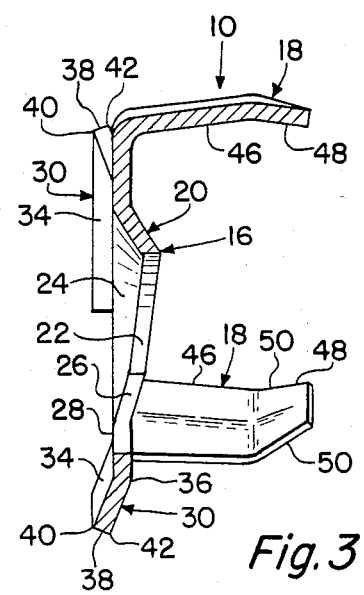
FIG. 3 is a parital sectional view of the tube connector as taken substantially along the line 3—3 in FIG. 2.
Figure 4:
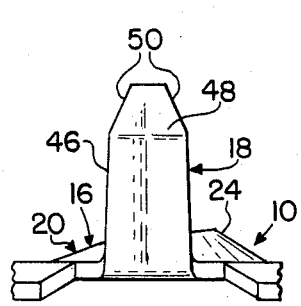
FIG. 4 is a side view of the tube connector as taken substantially along the line 4—4 in FIG. 2.

A tube connector 10 constructed in accordance with the present invention is shown in the drawings, and specifically in FIG. 1 is shown in installed position to a tube 12 adjacent an end 14 thereof. The tube connector comprises a body portion 16 and a plurality of legs 18, illustrated as three in number.

As seen in FIGS. 1-4, the body portion 16 comprises in part a sheet metal nut 20 having a central aperture 22 with the sheet metal surrounding the aperture 22 formed into a helical impression 24 for receipt of a screw or the like fastener. A cut or radial slit 26 is provided to permit offsetting of the ends of the helical impression. As will be appreciated the helical impression forms a dish-shape in the body of the connector.

Outwardly of the helical impression 24 the body comprises a flat or planar ring section 28. Outwardly of the ring section the body comprises a plurality of arcuate segments 30 lying between pairs of radial edges 32, and having outer flanges 34 deflected upwardly along arcuate bend lines 36. Due to this upward deflection and the thickness of the sheet steel from which the washer is formed the lower margin 38 of each arcuate segment 30 projects radially beyond the corresponding upper margin 40 as best may be seen in FIGS. 2 and 3. Accordingly, it is the lower margin 38 that impinges against the inner surface of the tube 12 when the connector is in installed position. In a preferred embodiment the body portion of the connector is struck so that there is a bit of burr 42 formed along the lower, outer margin 38 of each arcuate segment 30.

This margin 38 bites into the inner surface of the tube 12 as will be set forth more particularly hereinafter, and the biting action is enhanced by the presence of the burr 42 which provides a sharper marginal edge than would be possible without the burr 42.

The legs 18 comprise hip portions 44 coplanar with the ring portion 28 which extend radially almost as far as the outer margins 38, 40 of the deflected flanges 34, thereafter each leg 18 is bent almost at right angles forming slightly diverging elongated portions 46 having inwardly deflected tips 48 tapering along the edges as indicated at 50. The entire elongated portions 46 of the legs taper slightly inwardly as may be seen at FIG. 4 with the taper at 50 substantially augmented. The taper along the entire length of the legs, and particularly the taper at 50 and the deflection at 48 materially aids in centering the connector when it is pushed into a tube. The legs 44 have a V-shaped cross-section with an inwardly directed apex 52, and outer margins 54 at the margins of the V-shape. These margins in a preferred form of the invention are struck so as to have burr 56 thereon, enhancing the sharpness of the margins.

When a tube connector 10 constructed in accordance with the present invention, as heretofore shown and described, is pushed into the end of a tube 12 the inwardly deflected tips 48 of the legs, along with the tip taper 50, and to a lesser extent the taper of the entire legs materially aid in positioning the connector within the end of the tube. The legs initially flare outwardly somewhat throughout their major length, as heretofore indicated, and the hardened steel of the connectors is sufficiently resilient to allow the legs to collapse substantially into parallelism with the axis of the connector and of the tube, at right angles to the ring-like section 28 of the body. Entrance of the body into the tube is augmented by the dished shape in that the flanges 30 can deflect somewhat in a reverse direction to permit insertion, it being understood that the flanges initially are slightly too great in outside circumference to permit entry. The deflection is augmented by pressure on the inner portion of the body, which being already dish-shaped collapses somewhat further into a dished shape, thus retracting the outer circumference. Upon release of an inserting tool (or a finger or thumb) the outer circumference tends to return to its initial diameter, thus causing the lower, outer margins 38 to bite aggressively into the material of the tube 12. It will be clear that the tube 12 may be made of a metal somewhat softer than the hardened or tempered sheet steel of the connector 10 or be made of plastic. The tendency of the margins 38 augmented by the burr 42 to bite into the material of the tube is enhanced when a threaded fastener pulls on the helical impression 24 axially in a retracting direction, since this tends to flatten the dish construction of the body portion 16, thereby tending to increase the outer diameter of the body.

Rotation of the connector is resisted in part by the sharp edge or margin 38 augmented by the burr 42, but more particularly is resisted by the sharp outer margins 54 of the V-shaped legs 18, particularly as augmented by the burr 56. The tendency of the dish-shaped body to flatten and increase its outer diameter also tends to extend the legs 18 radially outwardly, thus augmenting the biting of the margins 54 and the burr 56 into the material of the tube 12 to resist turning of the connector within the tube.

Figure 5:
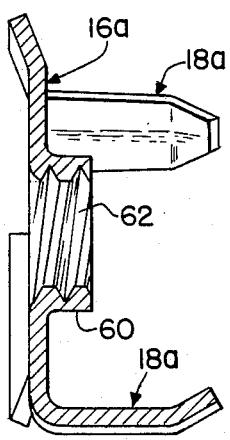
FIG. 5 is a partial sectional view of another embodiment of the instant invention having a centrally disposed tapped aperture.

A modified form of the present invention is shown in FIG. 5 which is similar to the structure described above as indicated by the application of identical reference numerals to corresponding parts thereof with the addition of the suffix "a". In this embodiment the aperture 22 and the helical impression 24 forming the sheet metal nut 20 is supplanted by a tapped tubular segment 60. The tubular segment 60 extends axially from the same side of the body portion 16b that the legs 18b extend and includes internal threads 62 adapted to receive and secure a threaded member relative thereto, e.g., an adjustable foot for a table leg having a bolt extending therefrom for securing the same to the tubular leg (the described assembly not shown). The tubular segment 60 is generally formed during the stamping operation and the threads 62 are cut subsequently by a tapping operation.

Figure 6:
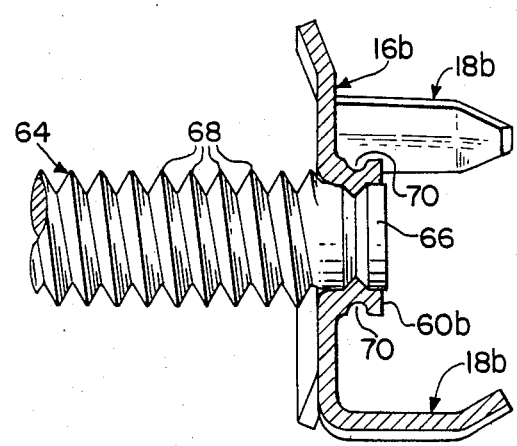
FIG. 6 is a partial sectional view of a further embodiment of the invention showing an axially extending threaded member.

Another form of the present invention is shown in FIG. 6 which is similar to the structure described above as indicated by the application of identical reference numerals to corresponding parts thereof with the addition of the suffix "b". This variation of the disclosed invention includes an axially extending threaded member 64 having an end 66 staked within a tubular segment 60b centrally located relative to the body portion 16b. The tubular portion 60b extends axially from the body portion 16b in the same direction that the legs 18b extend while the threaded member 64 extends axially in a direction opposite to the direction in which the legs 18b extend. The threaded member 64 includes external threads 68 and may be secured to the body portion 16b by any suitable means and in the shown form is staked, i.e., by detents 70. The threaded member 64 may be left extending from the end of the tube or be positioned within the tube and in any case is particularly suited to attach a threaded or thread gripping type article (not shown) thereto.

Accordingly, another part such as a tube or a mounting or other structural member can be secured to the end of the tube 12 by means of a threaded fastener, e.g., a bolt or a nut, without fear of the tube connector 10 pulling loose from the end of the tube or turning within the tube thereby preventing the fastener from obtaining maximum tightness.

The specific example of the invention as herein shown and described is for illustrative purposes only, and various changes will no doubt occur to those skilled in the art. Such changes will be understood as forming a part of the present invention insofar as they fall within the spirit and scope of the appended claims.

I claim:

1. A tube connector constructed from an integral sheet metal stamping comprising a body and a plurality of legs, said body having a centrally disposed securing portion for receipt of a threaded fastener and being of a substantially dished shape, said dish-shaped body having a plurality of spaced arcuate segments, each of said arcuate segments having a sharp peripheral edge for aggressively engaging the interior wall of a tube, said plurality of legs being formed in alternate arrangement with said arcuate segments and spaced therefrom by a marginal recess, each of said plurality of legs extending from said body adjacent said arcuate segments and bent at a substantially right angle in a direction opposite to the direction of said arcuate segments, the elongated portion of each of said legs being substantially longer than the width of said dish-shaped body and having sharp longitudinal edges for aggressively engaging the interior wall of a tube.

2. A tube connector as set forth in claim 1 and further including a burr on at least one of said peripheral edges and said longitudinal edges for augmenting resistance to movement of said connector relative to said tube.

3. A tube connector as set forth in claim 1 wherein each of said legs has a substantially V-shaped cross-section.

4. A tube connector as set forth in claim 1 wherein said legs initially extend away from said body portion in diverging relation to enhance engagement with said interior wall of said tube when deflected to parallel relation by engagement with said wall.

5. A tube connector as set forth in claim 4 wherein the ends of said legs converge to aid in inserting said connector into said tube.

6. A tube connector as set forth in claim 5 wherein the ends of said legs taper to aid in insertion.

7. A tube connector as set forth in claim 1 wherein said securing means includes a centrally disposed aperture in said body portion with a helical impression formed in said body portion around said aperture.

8. A tube connector as set forth in claim 1 wherein said securing means includes a centrally disposed internally threaded tubular segment.

9. A tube connector as set forth in claim 1 wherein said securing means includes an axially extending threaded member.

* * * * *